March 20, 1951  J. FELIP ET AL  2,545,947
ARTIFICIAL PNEUMATIC HAND
Filed June 7, 1949  3 Sheets-Sheet 1
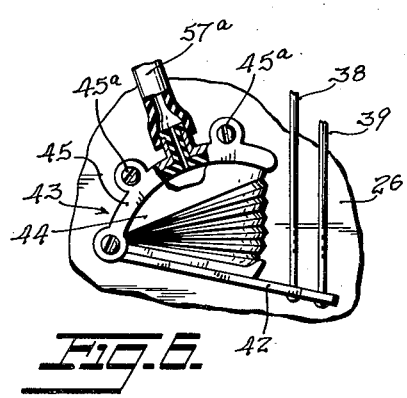
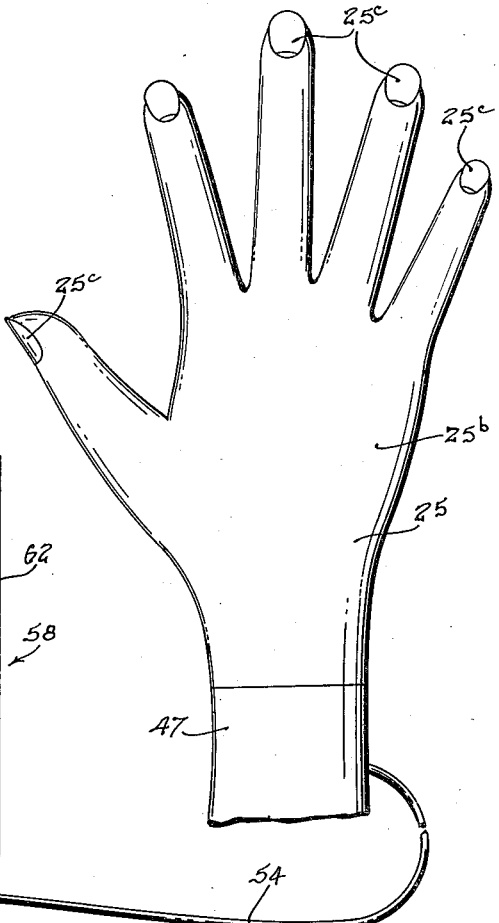
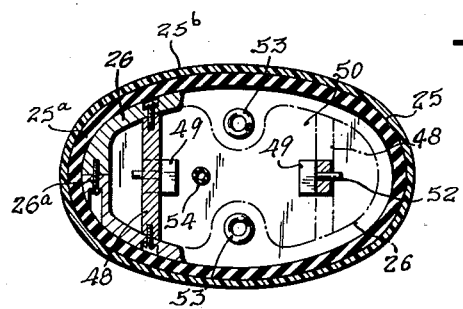
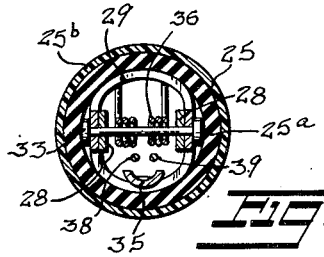
INVENTORS
JEANNE FELIP
BY ANGELO BIASI
ATTORNEY

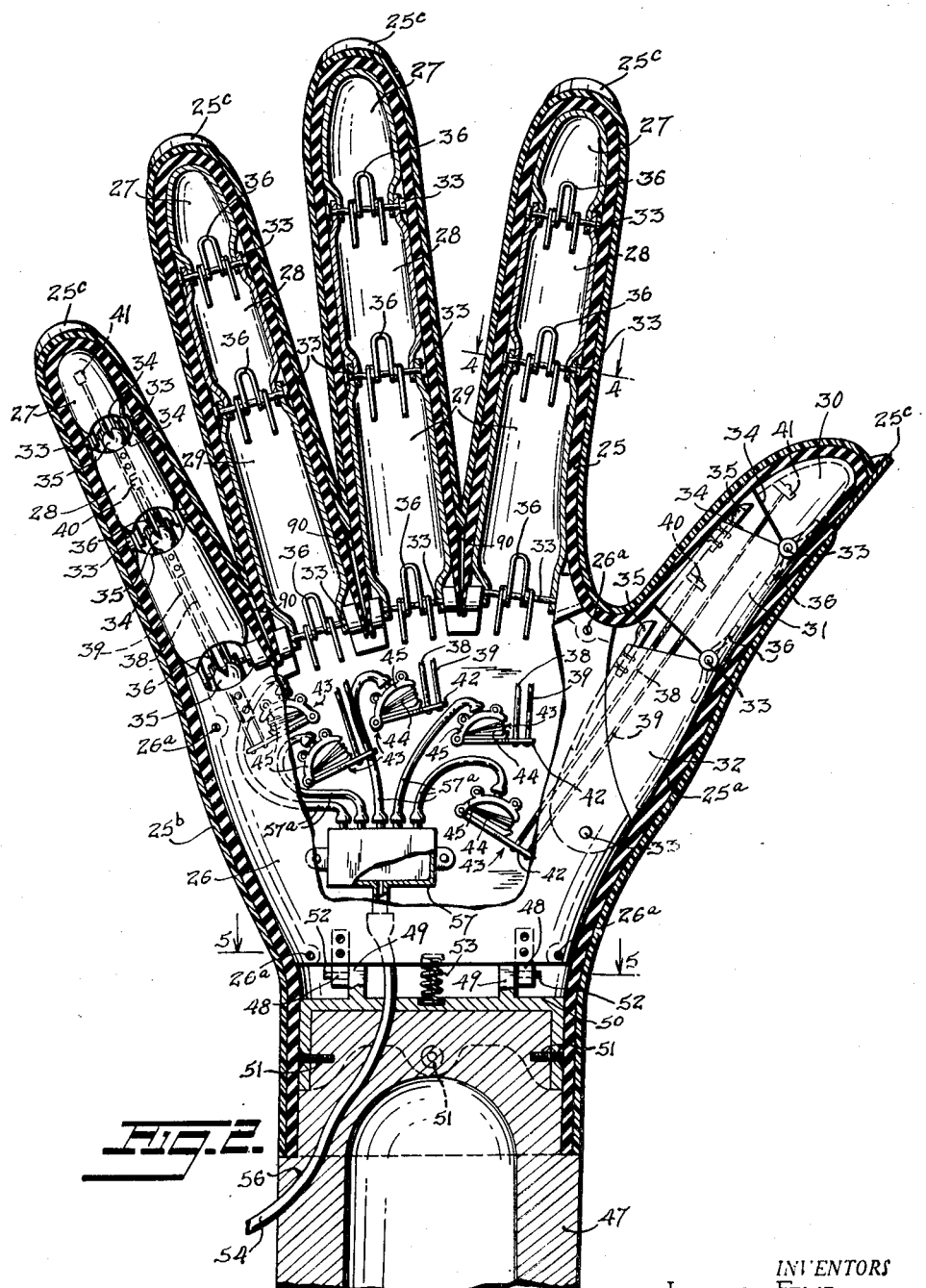

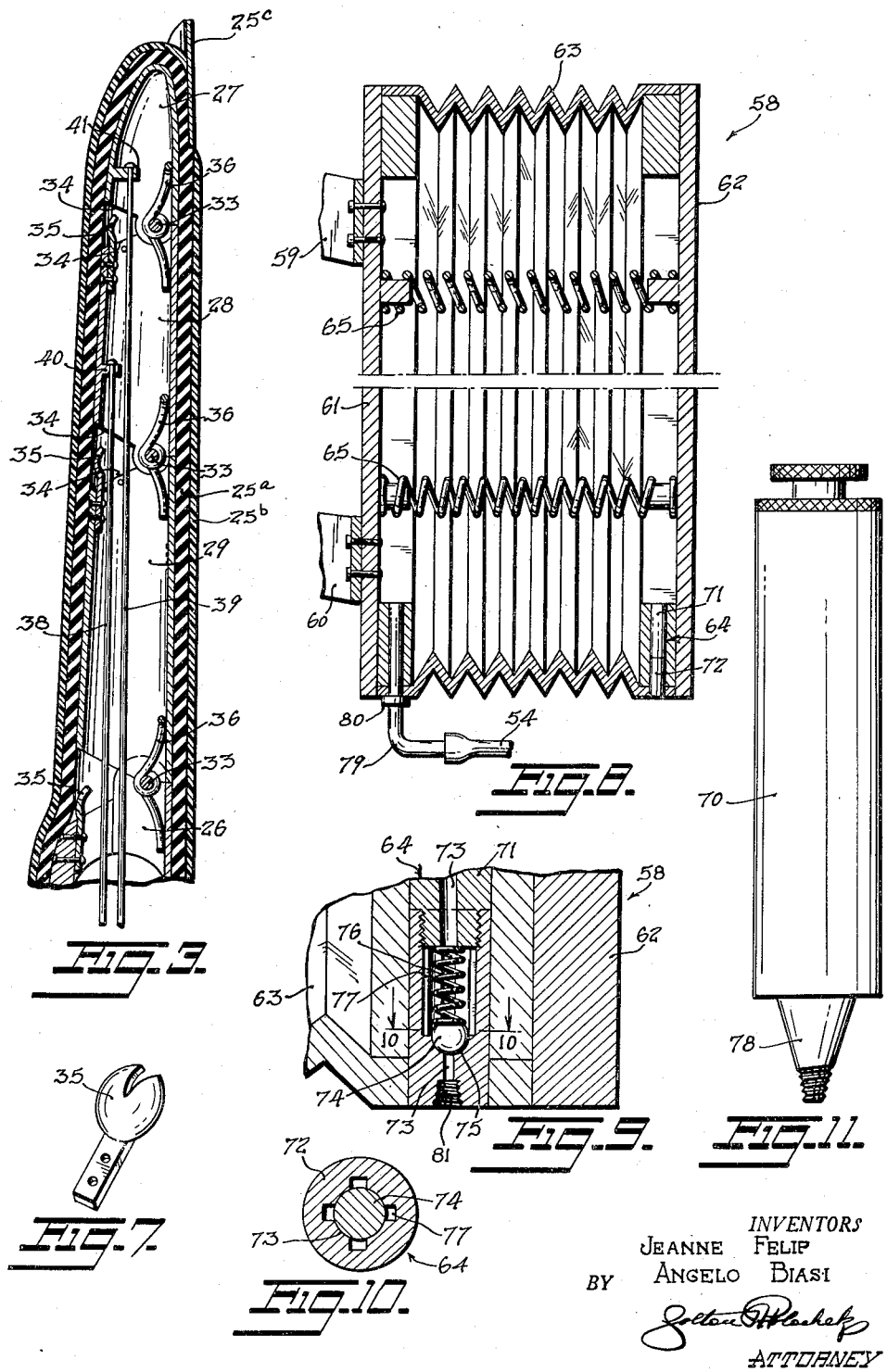

Patented Mar. 20, 1951

2,545,947

UNITED STATES PATENT OFFICE 2,545,947

ARTIFICIAL PNEUMATIC HAND

Jeanne Felip, New York, N. Y., and Angelo Biasi, Hazelton, Pa.

Application June 7, 1949, Serial No. 97,502

7 Claims. (Cl. 3—12)

The present invention relates to new and useful improvements in an artificial hand.

More particularly the present invention proposes an improved artificial hand, whether of the type simulating closely an actual hand in external conformation, coloration and the like or of the type including relatively movable grab hooks, and the aim is to provide a novel and valuable such hand wherein means are provided for moving all the fingers and thumb and in the case of each at the several joints thereof, in unison, with each of these five digital members being inclusive of joints corresponding to all those in the human hand and further with the artificial hand inclusive of a joint substantially like that between the metacarpal region and the wrist, and all in combination with a placement of and construction for said joints such that multiple flexure of each of said digital members and pivotal movement of the wrist may be present in a markedly close resemblance to actual digital flexures and wrist movement in the human body.

Another particular object of the invention is to provide an artificial hand which may be readily caused to assume, relative to an object or article to be held, a grip as strong (for example, one adequate to seize and hold an object or article weighing ten pounds) as that which can be exerted by a human hand of other than phenomenal strength.

A further particular object of the invention is to provide an artificial hand as above which is equipped with resiliently yielding means for normally holding the digital members straight and unbent at the knuckles and the like and also for holding the wrist region to the normal ordinary extended position, and which in combination with the resiliently yielding means incorporates pneumatically actuated and operating means completely under the control of the wearer of the new hand and in such wise that at will he may govern the finger and thumb movements, and this inconspicuously and indeed substantially invisibly, exactly as desired.

According to the present invention, the artificial hand, furthermore, may be made of relatively light weight, with its working parts rugged and long enduring, and with the outer appearance of the hand closely simulative of the skin sheathing of a human hand.

With the major inner parts of the hand constructed of fairly hard aluminum, as a suitable aluminum alloy, or of a suitable plastic, to obtain strength with slight weight, the outer covering or sheathing for the new hand may well be of canvas or some other suitable textile or other sheet material, or, ideally, of a fairly soft and freely flexible natural or synthetic rubber or like composition. This last-named material in the course of the making of said sheathing may be textured like the human skin and then or thereafter colored and otherwise made to look exactly like the epidermis of a human hand, whether the new artificial hand is in repose or in action; even to the extent of the inclusive of such additions as artificial finger-nails and such hirsute minutiae as would be appropriate in the case of an adult male's hand.

Another object of the present invention proposes forming the outer sheathing of an inner portion of rubber and an outer portion of a suitably colored skin-like flexible resinous plastic material and to form the inner portion at the bases of the fingers with slits in a manner to render the sheatheing more flexible for greater finger movement.

It is a further object of the present invention to construct an artificial hand which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is an elevational view, looking at the back side of an artificial hand constructed in accordance with the present invention.

Fig. 2 is an enlarged elevational view, looking at the palm side of the artificial hand but with the skin sheath shown in section and with certain of the inner parts broken away.

Fig. 3 is an enlarged longitudinal sectional view taken through one of the fingers of the artificial hand.

Fig. 4 is an enlarged transverse sectional view of the index finger taken on the line 4—4 of Fig. 2.

Fig. 5 is an enlarged transverse sectional view of the wrist of the artificial hand taken substantially on the line 5—5 of Fig. 2.

Fig. 6 is an enlarged elevational view of one of the minor bellows having a portion thereof broken away to reveal interior constructions.

Fig. 7 is a perspective view of one of the metal shields, per se.

Fig. 8 is a vertical sectional view taken through the master bellows.

Fig. 9 is an enlarged vertical sectional view taken through the valve controlling the air entrance to the master bellows.

Fig. 10 is an enlarged transverse sectional view of the valve taken on the line 10—10 of Fig. 9.

Fig. 11 is a side elevational view of the hand pump which is to be used for inflating the master bellows.

The artificial hand, according to the present invention, includes a sheathing 25 which encloses the major portion of the artificial hand. The sheathing is comprised of an inner portion 25a of rubber and an outer portion 25b. The outer portion 25b may be made of cloth or other similar flexible material, but is preferably made of one of the skin-like flexible resinous plastic materials suitably colored to closely resemble the color of the skin of a normal hand. The inner portion 25a of the sheathing 25, between each of the four fingers and at the base thereof, is formed with slits 90, see Fig. 2. The slits 90 make the sheathing somewhat more flexible and frees each of the fingers for easier movement with relation to each other and the palm portion of the artificial hand.

At suitable points at the ends of the fingers and the thumb of the artificial hand, at the back thereof, the inner portion 25a of the sheathing 25 is exposed through the outer portion 25b and has secured thereto artificial finger-nails 25c. The finger-nails 25c are also preferably formed of a suitably colored resinous plastic material and are secured in position by means of a mucilage having affinity for the rubber of the inner portion 25a and the material of which the finger-nails 25c are formed.

Inside the sheathing there is positioned a cavitated metacarpal member 26. The metacarpal member 26 is formed of two opposed molded portions secured together by removable screws 26a, see Figs. 2 and 5. Also, similarly positioned within the sheathing 25 are the three members for the three phalanges of each of the four fingers and the thumb of the hand, in the case of each of the four fingers these members are respectively designated 27, 28 and 29. The three thumb members are respectively marked 30, 31 and 32.

Each adjacent pair of the members 27 and 28, 28 and 29, 29 and 26, 30 and 31, 31 and 32, 32 and 26, meet at a joint incorporating a pivot-pin 33, as shown in Figs. 2, 3 and 4.

The meeting ends of any two adjacent members at any joint along a finger or thumb are, at the palm sides of the hand, inclined away from each other and from the respective pivot pin 33, as indicated at 34; thereby to allow the fingers and the thumb to be not only straightened out but also to be bent at a desired joint along the finger or thumb length. At the same time, to prevent collapse and inward creasing and perhaps pinching of the sheathing 25, at the palm sides of the fingers and at the palm adjacent side of the thumb, there is at such joint, as shown in Fig. 4, a stamped metal shield 35, said shield suitably secured at one end portion to the end portion of one of the members meeting at said joint. Also at said joint is a single bent wire torsion spring 36, engaged with the parts in the manner shown in full lines in Fig. 3 to hold the finger and thumb members in their longitudinal extended positions.

As indicated in Figs. 2 to 4, lengthwisely of each of the members of the fingers and of the thumb, the members are tubular for the passage of flexible pull cables or cords 38 and 39 in such manner that the cable 38 extends all the way from the cavitation in the metacarpal member 26 through a finger or thumb to an anchor post 40, see Fig. 3, in the hollow interior of the middle member 28 or 31 of that finger or thumb and the cable 39 extends all the way from the cavitation in the metacarpal member 26 through a finger or thumb to an anchor post 41 in the hollow interior of the outermost member 27 or 30 of that finger or thumb.

These cables, as best shown in Figs. 2 and 6, are at their lower ends connected in a special way to the swing arm 42 of a suitably fixedly anchored carrier and squeezer 43 for a minor bellows 44. The immovable arm 45 of each carrier is secured to the back portion of the metacarpal member 26, in the hollow thereof, by several screws 45a. There are five of these minor bellows, one for each finger and one for the thumb. Note the manner in which the cords 38 and 39 are connected to the outer end of the appropriate arm 42; that is, each cord 39 is connected to its said arm 42 at a greater distance from the fulcrum of swing of said arm than is the cord 38.

Thus on inflating all the five minor bellows, all the five digital members of the hand curl inwardly toward the palm thereof in exactly the same manner as the human fingers and thumb thus curl in to grasp an object. Such inward multi-joint-redispositional movement of the fingers and thumb of the artificial hand may be progressed to a desired limited extent toward and to the palm, dependent on the air pressures simultaneously admitted to the interiors of the five minor bellows.

While pursuant to the invention a sixth minor bellows could be suitably installed, as in the cavitation of the metacarpal member 26, or in a suitable cavitation in a wrist extension member 47 (now also see Figs. 5 and 6), for inflation of said sixth bellow simultaneously with inflation of the five bellows 44, thereby to pull a cord or the like and give a movement to the hand at the wrist joint, it is now preferred to rely merely on a spring-biased pivotal joint at the joinder of the hand and the extension member 47.

This pivotal mounting includes a pair of post-like projections 48 depending from the metacarpal member 26 and a pair of similar upwardly projecting post-like members 49 on the extension member 47 and directly carried by a shell-like metal crown piece 50 secured to the extension member 47 by screws 51. The posts 49 are so spaced that they fit in between the posts 48, and they are formed with pivot pins 52 which are turnably passed through complementary holes in the post 48. The spring biasing for this pivotal joint is constituted by two fairly stiff closely wound coil springs 53, each having its end portions fitted into cylindrical recesses which are upwardly extended into the bottom of the metacarpal member 26 and which are matchingly downwardly extended into the extension member 47.

The master supply tube 54 for the five minor bellows 44 extends as shown in Fig. 2 diagonally through a suitable channel 56 inside the extension member 47 and into the metacarpal member 26. The upper end of the tube 54 is connected to a manifold 57, see Fig. 2, securely mounted within the metacarpal member 26, to the back portion thereof. Extending from the manifold 57 there are five branch smaller tubes 57a each to one of the minor bellows 44.

The tube 54 leads from a master bellows 58 equipped with a strap means comprising upper and lower adjustably bucklable straps 59 and 60. The master bellows 58 is illustrated as having board like side walls 61 and 62, forming, together with an accordion like intermediate shell 63, the body of the bellows to provide therein a chamber adapted to be filled with air under pressure by means of hand pump 70 and by way of a ball-type one-way air inlet valve 64. Suitable spring means, as indicated at 65, are in the bellows 58, so that, with the bellows distended by air therein under pressure, arm or other squeeze against the said bellows will cause inflation of all the minor bellows 44, and cause greater or less inflation of the latter according as such pressure on the main bellows is increased or diminished. The action of the spring means 65 is such that they act in conjunction with the springs in the five hand digits when the main bellows is relieved of all pressure thereagainst the said bellows is expanded sufficiently to cause flow back thereinto of the excess air in the minor bellows, so that the latter immediately return to normal collapsed condition.

The ball-type one-way air inlet valve 64 is constructed of two sections 71 and 72 which have their adjacent ends screw threaded together. The sections 71 and 72 are formed with end aligned passages 73 and the inner end of the passage 73 in the section 72 is enlarged to house a ball 74 which is urged toward a valve seat 75 by means of a spring 76. The enlarged inner end of the passage 73 of the section 72 is formed with grooves 77 for the by-pass of air when the ball 74 is unseated from the seat 75. The outer end of the passage 73 in the section 72 is formed with a conical shaped threaded enlargement 81 which is to be engaged by a complementary threaded end portion of a conical nipple 78 formed on the hand pump 70, shown in Fig. 11. The end of the tube 54 is connected to a metallic tube 79 which leads from the master bellows 58 and which includes intermediate of its ends a swivel connection 80 permitting movement of the outer end thereof relative to the bellows 58.

The operation of the artificial hand is as follows:

The wrist extension 47 is formed with a cavity extended in from the free end thereof, by which the hand can be mounted on the end of an arm stump. With the end of the tube 54 connected to the metallic tube 79, the nipple of the hand pump 70 is screwed into the one-way inlet valve 64. The pump 70 is then operated to force air past the ball 74 of the inlet valve 64 and to inflate the master bellows 58 and the minor bellows 44 to the point where the fingers and the thumb of the artificial hand just start to curl toward the palm of the hand. The pump 70 is then unscrewed from the inlet valve 64 and the master bellows 58 is then strapped about the body preferably beneath one of the arms. The master bellows 58, the tube 54 and the minor bellows 44 then function as a closed system to cause the fingers and the thumb to be curled toward the palm of the hand as the slightest pressure is exerted against the bellows 58. The more pressure applied to the master bellows 58, the more the fingers and thumb will be curled toward the palm of the artificial hand. When the pressure on the master bellows 58 is released, the springs 65 will immediately extend the master bellows 58 setting up a slight vacuum within the master bellows 58 which will immediately function to draw the air from the minor bellows 44 back into the master bellows 58 freeing the fingers and thumb of the artificial hand to be urged back to their extended positions by the springs 36. The hand pump 70 is to be used to replace any of the air which bleeds from the system during use.

While we have illustrated and described the preferred embodiments of our invention, it is to be understood that we do not limit ourselves to the precise constructions herein disclosed and the right is reserved to all changes and modifications coming within the scope of the invention as defined in the appended claims.

Having thus described our invention, what we claim as new and desire to secure by United States Letters Patent is:

1. In an artificial hand, the combination, with a generally flexible casing therefor, of a plurality of interarticulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, and pneumatically actuated means operable at will for moving said members more and more as desired toward said metacarpal member for grasp-efficacious coaction therewith, said casing being generally elastically stretchable, and at each of said pivotal connections there being a means for preventing entanglement of said casing with the relatively movable members at said pivotal connection, each of the last-named means being a shaped sheet-like shield attached to at least one of the members meeting another of the latter at one of said pivotal connections.

2. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of minor bellows all in such cavitation and each operatively connected by an elongate flexible pull element to a plurality of the said members of a different one of the artificial fingers and thumb of the hand, said pull elements being present to a total of a pair thereof relative to each of the fingers and thumb and each of said pairs being arranged to be simultaneously pulled by the pneumatic means thereby simultaneously to move all three members of the associated finger or thumb toward said metacarpal member.

3. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of minor bellows all in such cavitation and each operatively connected by an elongate flexible pull element to a plurality of the said members of a different one of the artificial fingers and thumb of the hand, said pull elements being present to a total of a pair thereof relative to each of the fingers and thumb and each of said pairs being arranged to be simultaneously pulled by the pneumatic means thereby simultaneously to move all three members of the associated finger or thumb toward said metacarpal member, the means for pulling each pair of said pull elements including a pivoted element arranged to be rocked on inflation of the associated minor bellows.

4. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of minor bellows all in such cavitation and each operatively connected by an elongate flexible pull element to a plurality of the said members of a different one of the artificial fingers and thumb of the hand, said pull elements being present to a total of a pair thereof relative to each of the fingers and thumb and each of said pairs being arranged to be simultaneously pulled by the pneumatic means thereby simultaneously to move all three members of the associated finger or thumb toward said metacarpal member, in the case of each finger or thumb that one of the pull elements of the pair of said pull elements associated with a particular one of said fingers or thumb which is pulled to the greater extent being connected near one end to the outermost member of that finger or thumb and the other of said pair of pull elements being connected near one end to another member of that finger or thumb.

5. In an artificial hand, the combination, with a generally flexible and elastically stretchable casing therefor, of a plurality of inter-articulated members including a metacarpal member, four fingers and a thumb the several parts being pivotally interconnected to simulate the structure of a human hand, three members representative of the three actual phalange bones of each such elongate finger and thumb, in the case of each finger and the thumb the two outer ones of said members being pivotally interconnected and the innermost one thereof being pivotally connected to said metacarpal member, resiliently acting means associated with each of such pivotal connections for normally urging said finger and thumb members to non-grasp dispositions relative to the palm side of said metacarpal member, and pneumatically actuated means operable at will for moving said finger and thumb members more and more as desired toward said metacarpal member for grasp-efficacious coaction therewith, the means last-named including a master bellows, said metacarpal member being cavitated and said last-named means also including a plurality of minor bellows all in such cavitation and each operatively connected by an elongate flexible pull element to a plurality of the said members of a different one of the artificial fingers and thumb of the hand, said pull elements being present to a total of a pair thereof relative to each of the fingers and thumb and each of said pairs being arranged to be simultaneously pulled by the pneumatic means thereby simultaneously to move all three members of the associated finger or thumb toward said metacarpal member, in the case of each finger or thumb that one of the pull elements of the pair of said pull elements associated with a particular one of said fingers or thumb which is pulled to the greater extent being connected near one end to the outermost member of that finger or thumb and the other of said pair of pull elements being connected near one end to the middle member of that finger or thumb.

6. In an artificial hand, the combination, with a generally flexible casing therefor, of a plurality of inter-articulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, and pneumatically actuated means operable at will for moving said members more and more as desired toward said metacarpal member for grasp-efficacious coaction therewith, and means for rendering the casing more flexible in the area between the fingers at the base thereof, said latter-mentioned means comprising slits formed between the fingers and at the base thereof.

7. In an artificial hand, the combination, with a generally flexible casing therefor, of a plurality of inter-articulated members including a metacarpal member, four fingers and a thumb the several parts being pivotally interconnected to simulate the structure of a human hand, resiliently acting means associated with each of such pivotal connections for normally urging said members to non-grasp dispositions relative to the palm side of said metacarpal member, and pneumatically actuated means operable at will for moving said members more and more as desired toward said metacarpal member for grasp-efficacious coaction therewith, and means for rendering the casing more flexible in the area between the fingers at the base thereof, said latter-mentioned means comprising slits formed between the fingers and at the base thereof, said casing comprising an inner portion of rubber and an outer portion of a suitably colored skin-like plastic material and said slits being formed in said inner portion.

JEANNE FELIP.
ANGELO BIASI.

REFERENCES CITED

The following references are of record in the file of this patent:

UNITED STATES PATENTS

| Number | Name | Date |
| --- | --- | --- |
| 2,259,911 | Tancred et al. | Oct. 21, 1941 |
| 2,457,305 | Dale | Dec. 28, 1948 |

FOREIGN PATENTS

| Number | Country | Date |
| --- | --- | --- |
| 1,68° | Germany | July 27, 1877 |
| 484,845 | France | Nov. 13, 1917 |